United States Patent [19]
Busboom et al.

[11] Patent Number: 5,816,033
[45] Date of Patent: Oct. 6, 1998

[54] RIDING LAWN MOWER INCLUDING A MOWER DECK HEIGHT CONTROL MECHANISM

[75] Inventors: Garry W. Busboom; John C. Crumrine, both of Beatrice, Nebr.

[73] Assignee: Exmark Mfg. Co., Inc., Beatrice, Nebr.

[21] Appl. No.: 899,680

[22] Filed: Jul. 24, 1997

Related U.S. Application Data

[63] Continuation-in-part of Ser. No. 559,575, Nov. 16, 1995.

[51] Int. Cl.⁶ .................................................. A01D 69/00
[52] U.S. Cl. ....................... 56/10.8; 56/17.1; 56/121.46; 56/15.2; 56/DIG. 22
[58] Field of Search .............................. 56/10.2 E, 14.7, 56/16.7, 17.1, DIG. 22, DIG. 7, 121.4, 121.46, 15.1, 15.2

[56] References Cited

U.S. PATENT DOCUMENTS

| | | | |
|---|---|---|---|
| 766,127 | 7/1904 | Wilson | 56/121.46 |
| 1,877,278 | 9/1932 | Davis | 56/121.46 |
| 3,187,821 | 6/1965 | Kamlukin | 56/DIG. 22 X |
| 3,512,344 | 5/1970 | Kortum | 56/17.1 D |
| 3,706,188 | 12/1972 | Quiram | 56/DIG. 22 X |
| 4,577,455 | 3/1986 | Amano et al. | 56/17.1 |
| 4,679,382 | 7/1987 | Surahashi et al. | 56/DIG. 22 X |
| 4,779,406 | 10/1988 | Schroeder | 56/DIG. 22 X |
| 4,787,195 | 11/1988 | Wenzel | 56/11.1 |
| 4,920,734 | 5/1990 | Wenzel | 56/11.1 |
| 4,941,864 | 7/1990 | Bottum | 474/133 |
| 4,958,484 | 9/1990 | Busboom | 56/255 |
| 4,967,543 | 11/1990 | Scag et al. | 56/10.8 |
| 5,077,959 | 1/1992 | Wenzel | 56/11.1 |
| 5,127,215 | 7/1992 | Wenzel | 56/11.1 |
| 5,129,217 | 7/1992 | Loehr | 56/13.6 |
| 5,155,985 | 10/1992 | Oshima et al. | 56/10.8 |
| 5,239,810 | 8/1993 | Gugel | 56/10.8 |
| 5,249,411 | 10/1993 | Hake | 56/11.6 |
| 5,251,429 | 10/1993 | Minato et al. | 56/17.2 |
| 5,337,543 | 8/1994 | Kitamura et al. | 56/10.8 |
| 5,355,661 | 10/1994 | Tomiyama | 56/10.8 |
| 5,518,079 | 5/1996 | Zvolanek | 180/191 |

OTHER PUBLICATIONS

Walker Mowers Brochure "Fast, Easy, Beautiful Mowing™" Dec. 1996.

*Primary Examiner*—Michael J. Carone
*Assistant Examiner*—Victor Batson
*Attorney, Agent, or Firm*—Zarley, McKee, Thomte, Voorhees & Sease; Dennis L. Thomte

[57] ABSTRACT

A mower deck height control is provided for a riding lawn mower and which includes a control lever operatively connected to the mower deck of the mower by means of linkages and chains. The control lever is pivotally movably mounted between a pair of vertically disposed and horizontally spaced-apart plates having registering openings formed therein which are adapted to receive a pin extending therebetween to limit the downward movement of the control lever with respect to the plates so that the proper cutting height is achieved. The control lever may be also positioned in a transport position.

2 Claims, 4 Drawing Sheets

RIDING LAWN MOWER INCLUDING A MOWER DECK HEIGHT CONTROL MECHANISM

CROSS-REFERENCE TO RELATED APPLICATION

This is a continuation-in-part application of application Ser. No. 08/559,575 filed Nov. 16, 1995, entitled HILLSIDE-STABLE POWERABLY-MOTIVATED LAWNMOWERS.

BACKGROUND OF THE INVENTION

1. Field of the Invention

This invention relates to a riding lawn mower and more particularly to a riding lawn mower having an improved mower deck height control mechanism.

2. Description of the Related Art

Riding lawn mowers normally comprise a wheeled frame means having a mower deck at the forward end thereof. It is desirable to be able to vertically move the mower deck not only to change the mowing height, but to raise the mower deck to a height sufficient for transport purposes. Heretofore, when it was desired to change the height of the mower deck either for mowing purposes or for transport purposes, it was normally necessary for the operator to manually remove locking pins or bolts from the deck height control mechanism each time it was desired to change the mower height or to raise the mower deck to its transport position. Further, after the prior art mower had been moved from one location to another with the mower deck in its transport position, it was again necessary for the operator to lower the deck to the proper position and again insert locking pins or bolts into the proper position so that the mower deck would be at the desired mowing height. Obviously, such a procedure was inconvenient and time-consuming.

SUMMARY OF THE INVENTION

A riding lawn mower having an improved mower deck height control mechanism is described including a frame means having drive wheels rotatably mounted at the rearward end thereof with an operator's station provided on the frame means. A mower deck is selectively vertically movably mounted on the frame means and is movable from a lower position to an upper position and various positions therebetween. A manually operated, movable linkage means is mounted on the frame means and supports the mower deck by means of flexible chains interconnecting the linkage means and the mower deck. An elongated deck height control lever is operatively connected to the linkage means and is selectively pivotally movable from a lower position wherein the mower deck is in its lowermost position with respect to the frame means, to an upper position wherein the mower deck is in its uppermost transit position with respect to the frame means. The control lever is movably positioned between a pair of vertically disposed, horizontally spaced-apart plate members which have a plurality of spaced-apart openings formed therein. A selectively removable pin extends through registering openings in the spaced-apart plates, below the control lever and in the movable path thereof for selectively limiting the lowermost position to which the control lever may be moved to limit the downward movement of the mower deck with respect to the frame means. One of the plates has a hook-like device at its upper interior end for selectively maintaining the control lever in its uppermost transit position so that the mower deck is maintained in its transport position with respect to the frame means. When the operator desires to lower the mower deck, from its uppermost transit position, to its mowing position, the operator simply disengages the control lever from the hook-like device and pivotally moves the control lever downwardly until it engages the pin which extends between the plates.

Therefore, it is a principal object of the invention to provide a riding mower having an improved mower deck height control mechanism.

Still another object of the invention is to provide a riding mower having an improved mower deck height control mechanism which permits the operator to "pre-set" the cutting height by placing a support pin below the deck height control lever.

Still another object of the invention is to provide a mower of the type described above wherein a supervisor can pre-set the cutting height and not have to worry about the operator failing to set the deck at the proper cutting height.

Yet another object of the invention is to provide a unique, quick-adjust cutting system which permits the operator to easily change the cutting height while seated.

Still another object of the invention is to provide a riding mower having an improved mower deck height control mechanism wherein the operator can raise the mower deck into its transport position while seated, without changing cutting height.

These and other objects will be apparent to those skilled in the art.

DESCRIPTION OF THE PREFERRED EMBODIMENT

Figure 1:
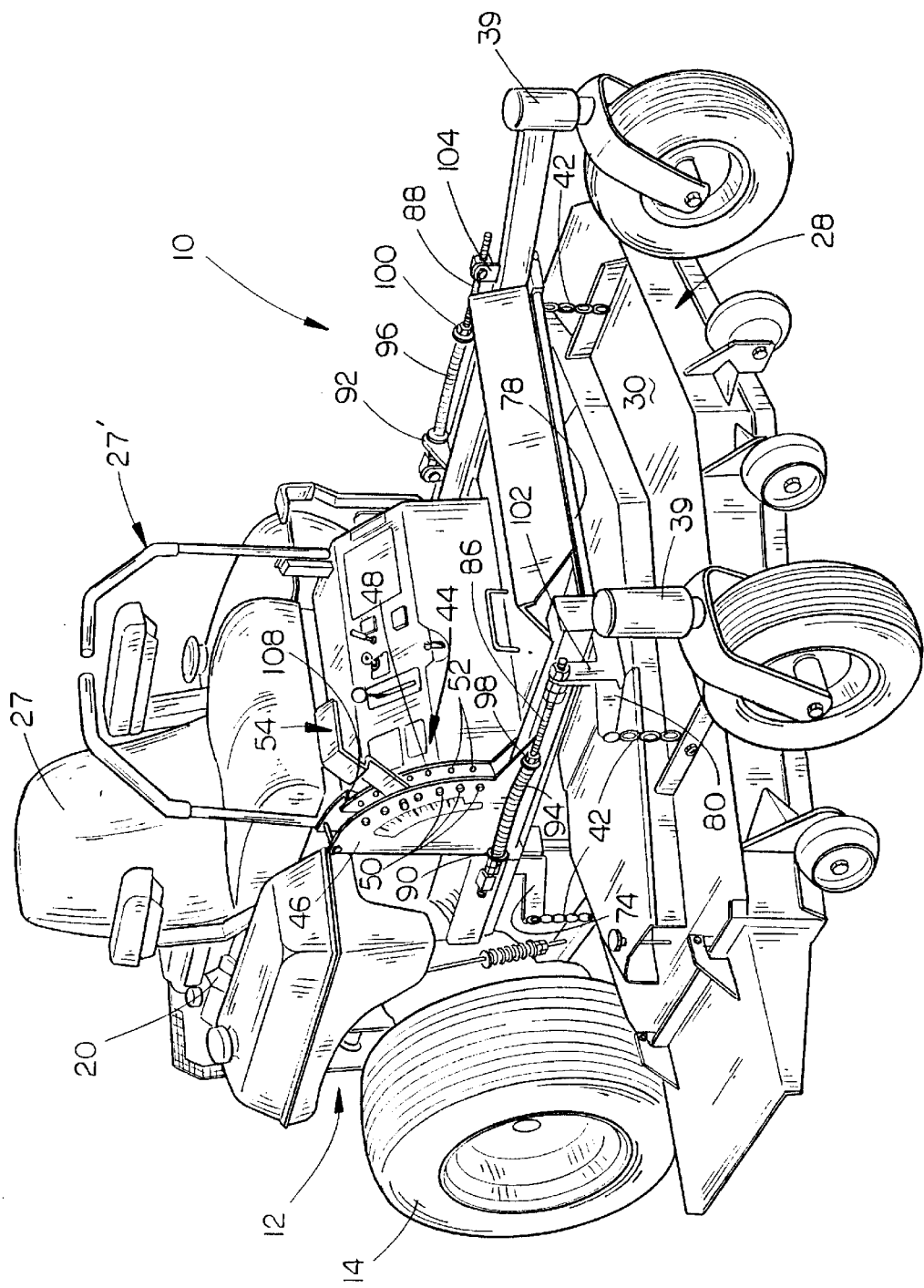
FIG. 1 is a front perspective view of the mower of this invention.
Figure 2:
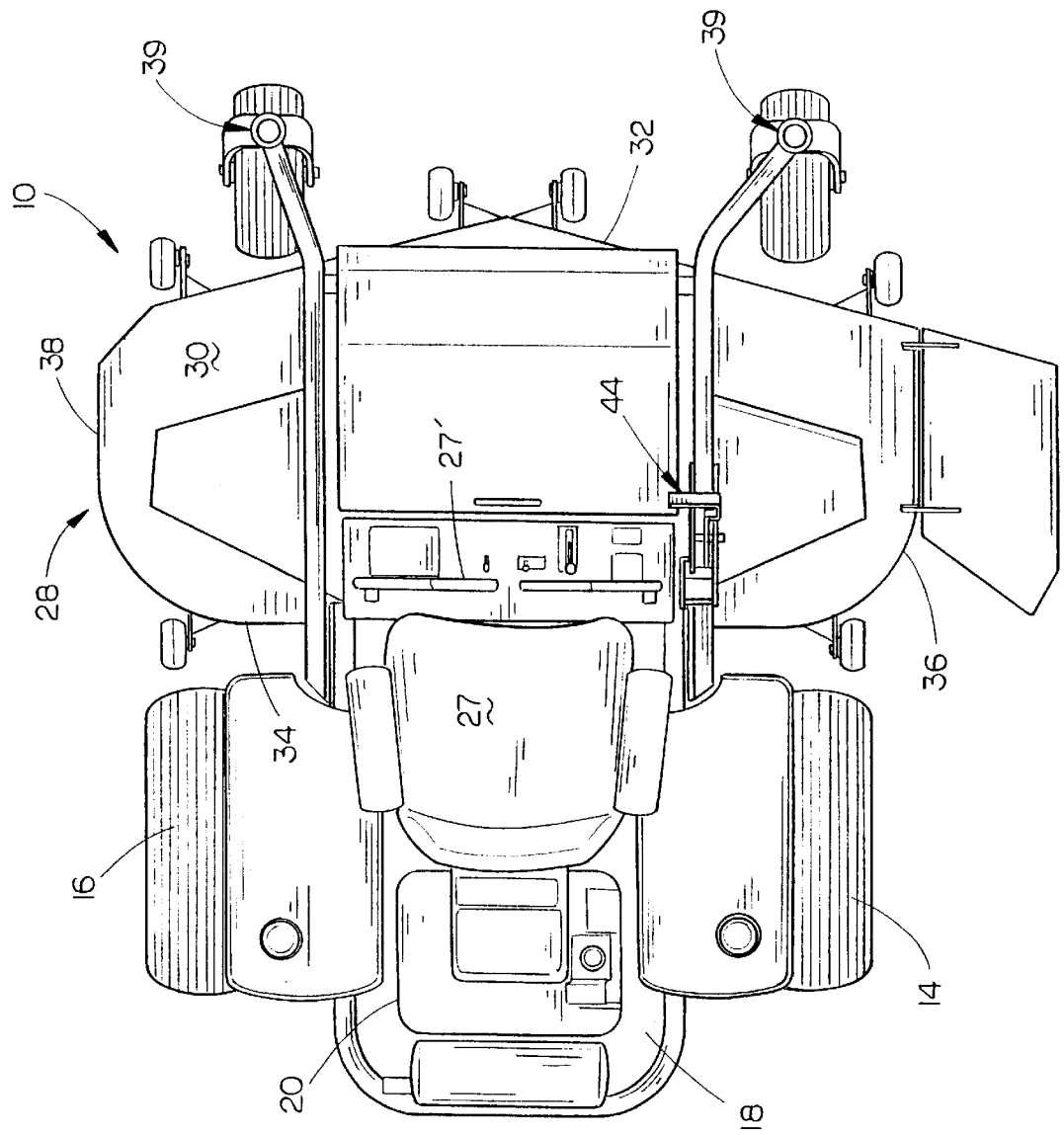
FIG. 2 is a top view of the mower of FIG. 1.
Figure 3:
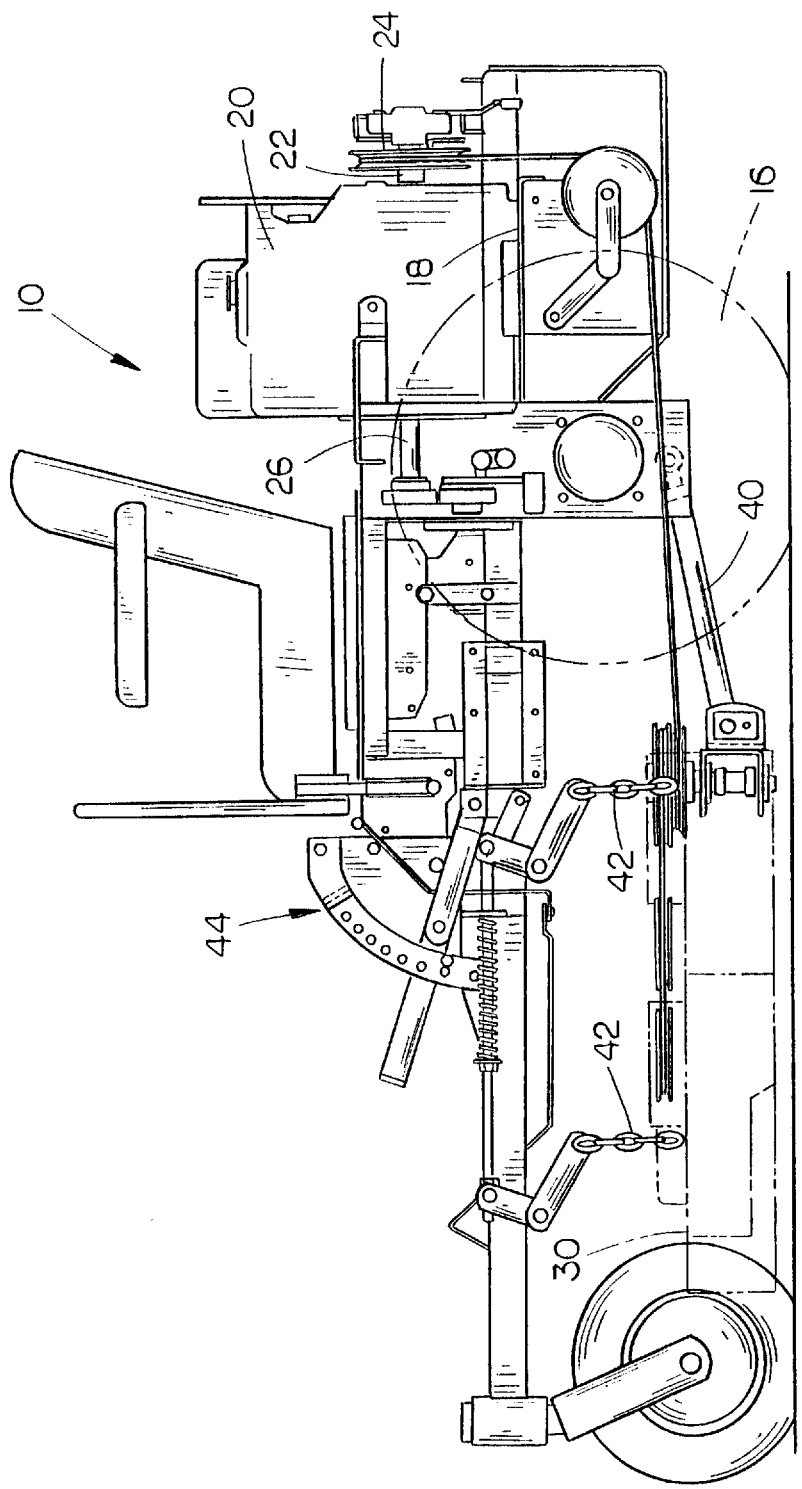
FIG. 3 is a partial side elevational view of the mower of FIG. 1.

The mower of this invention is referred to generally by the reference numeral 10 and is seen to be a riding lawn mower in the drawings. Although the invention described herein is ideally suited for use with a riding mower, it is believed that the invention described herein also has applicability with respect to walk-behind mowers. Mower 10 includes a frame means 12 having a pair of drive wheels 14 and 16 positioned on opposite sides of the frame means 12 at the rearward end of the mower. Mower 10 includes an engine support deck 18 which is disposed closely adjacent the rotational axes of the wheels 14 and 16, as been seen in FIG. 3. An internal combustion engine 20 is mounted on engine support deck 18 and has a rearwardly extending drive shaft 22 upon which is mounted a drive pulley 24. Engine 20 also includes a forwardly extending drive shaft 26 which is operatively connected to a pair of hydraulic pumps which are operatively connected to hydraulic motors operatively connected to the drive wheels 14 and 16, respectively. Mower 10 also includes an operator's station 27 and steering controls 27'.

Mower 10 includes a mower deck 28 at the forward end thereof which includes a top wall 30, front wall 32, rear wall 34, and opposite side walls 36 and 38. Caster wheel assemblies 39 support the forward end of deck 28. A stabilizer rod assembly 40 connects the rearward end of the mower deck 28 to the frame means 12 in conventional fashion. Mower deck 28 is supported by a plurality of chain members 42 which are connected to a mower deck height control mechanism generally referred to by the reference numeral 44 to enable the mower deck to be raised or lowered with respect to the frame means 12.

As stated, the numeral 44 refers to the mower deck height control mechanism of this invention which includes a pair of spaced-apart arcuate plates 46 and 48 having a plurality of spaced-apart openings 50 and 52 formed therein. Deck height control lever 54, having a lower end 56 and an upper end 58, is movably positioned between plates 46 and 48. The lower end 56 of lever 54 is pivoted to frame means at 60 and has a link 62 rigidly connected thereto for movement therewith. The rearward end of link 64 is pivotally connected to the lower end of link 62 at 66 and has its forward end pivotally connected to link 68 at 70. The lower end of link 68 is rigidly connected to a horizontally disposed and rotatable shaft 72 mounted on frame means 12. Shaft 72 has a pair of horizontally spaced-apart lift arms 74 and 76 rigidly secured thereto adjacent the opposite ends thereof which have chains 42 secured thereto and which extend downwardly therefrom for connection to mower deck 28. Horizontally disposed shaft 78 is rotatably mounted on frame means 12 forwardly of shaft 72 and has a pair of horizontally spaced-apart lift arms 80 and 82 rigidly secured thereto adjacent the opposite ends thereof, respectively. Chains 42 are secured to arms 80 and 82, respectively, and are connected to mower deck 28, as seen in the drawings.

Links 84 are rigidly connected to shaft 72 at the opposite ends thereof and extend upwardly therefrom. Threaded shafts or rods 86 and 88 are longitudinally adjustably pivotally secured, at their forward ends, to the upper ends of the links 84 and movably pass through brackets 90 and 92 which are secured to frame means 12. Springs 94 and 96 are mounted on shafts 86 and 88, respectively, forwardly of brackets 90 and 92 and are adjustably tensioned by nuts 98 and 100, respectively. Links 102 and 104 are longitudinally adjustably pivotally secured to the forward ends of bolts 86 and 88, respectively. The lower ends of links 102 and 104 are connected to shaft 78 for movement therewith.

Figure 4:
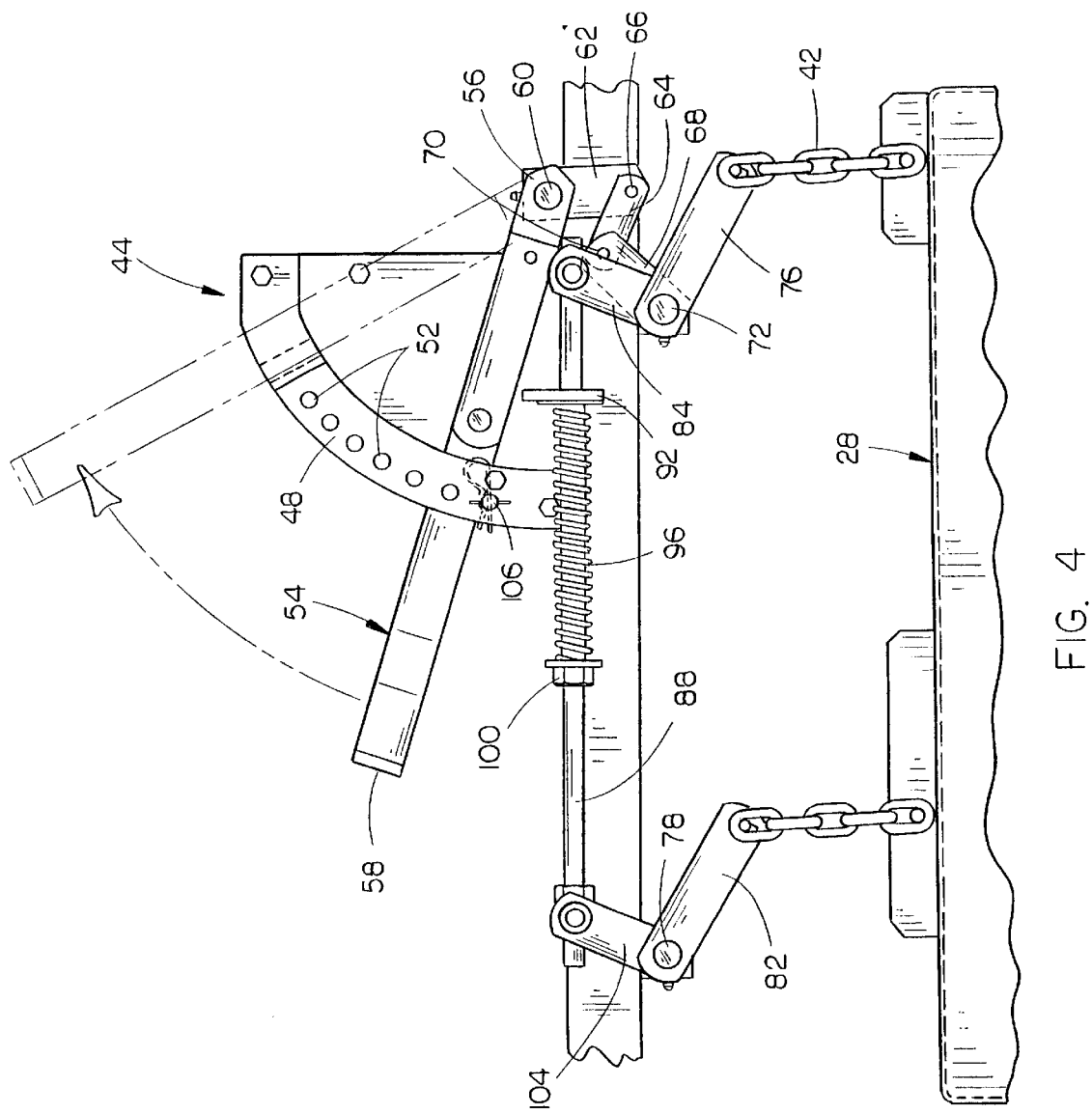
FIG. 4 is a partial side view illustrating the mower deck height control mechanism of this invention with the broken lines illustrating the control lever being raised to its upper position.

Thus, as viewed in FIG. 4, when the upper end of lever 54 is lowered, the deck 28 is lowered against the resiliency of the springs 94 and 96. Conversely, when the upper end of lever 54 is raised or moved rearwardly, deck 28 is raised with the springs 94 and 96 assisting in the raising operation.

In operation, the operator inserts a pin 106 through the desired registering openings 50 and 52 to limit the downward movement of lever 54 and thus control the deck height adjustment. The operator is able to insert or remove pin 106 while seated. If the operator desires to change the cutting height of the mower deck, the operator simply removes pin 106 and reinserts the pin 106 in the appropriate openings 50 and 52. When the operator desires to raise the mower deck 28 to a transport position, the operator raises or pulls the lever 54 upwardly and rearwardly until the lever is rearwardly of the rearward end of plate 48. The operator then pulls the lever 54 inwardly so that the lever 54 may be positioned in the slot or hook-like device 108 provided at the upper end of inner plate 48. Thus, the control lever is locked in its transport position and will remain therein until the operator wishes to position the mower deck in its cutting attitude. When the operator desires to position the mower deck in its cutting attitude or position, the operator simply pulls the upper end of the lever 54 rearwardly until the lever 54 clears the rearward end of plate 48 to enable the operator to again position the lever 54 between the plates 46 and 48. The operator simply lowers the lever 54 until the lever comes into engagement with the pin 106 which will cause the mower deck 28 to be properly positioned.

The arrangement of the lift lever 54, pin 106, plates 46 and 48, and hook-like member 108 permits the operator to move the control lever 54 to the various positions without the need of the operator visually observing the movement thereof. Further, the placement of the pin 106 between the plates 46 and 48 may be done by a supervisor which means that the operator will perform the mowing operation at the proper cutting height.

Thus it can be seen that the invention accomplishes at least all of its stated objectives.

We claim:

1. A riding lawn mower, comprising:

a wheeled frame means having rearward and forward ends and opposite sides;

an operator's station provided on said frame means;

a mower deck supported by said wheeled frame means at the forward end thereof;

said mower deck being selectively vertically movably mounted on said wheeled frame means and being movable from a lower position to an upper position;

means supporting said mower deck from said wheeled frame means comprising a manually operated, movable linkage means mounted on said wheeled frame means and a connection means interconnecting said linkage means and said mower deck;

an elongated control lever connected to said linkage means and being selectively pivotally movable from a lower position wherein said mower deck is in its said lower position with respect to said frame means, to an upper position wherein said mower deck is in its said upper position with respect to said frame means;

an arcuate frame means, having upper and lower ends, positioned adjacent said control lever and having a plurality of vertically spaced-apart openings formed therein;

a selectively removable pin means extending through one of said openings, below said lever and in the movable path thereof for selectively limiting the lowermost position to which said lever may be moved to limit the downward movement of said mower deck with respect to said wheeled frame means;

and lever receiving means on said upper end of said arcuate frame means for selectively receiving and maintaining said lever in its said upper position so that said mower deck is maintained in its said upper position with respect to said wheeled frame means;

said lever receiving means being laterally offset from said arcuate frame means.

2. A riding lawn mower, comprising:

a wheeled frame means having rearward and forward ends and opposite sides;

an operator's station provided on said frame means;

a mower deck supported by said wheeled frame means at the forward end thereof;

said mower deck being selectively vertically movably mounted on said wheeled frame means and being movable from a lower position to an upper position;

means supporting said mower deck from said wheeled frame means comprising a manually operated, movable linkage means mounted on said wheeled frame means and a connection means interconnecting said linkage means and said mower deck;

an elongated control lever connected to said linkage means and being selectively pivotally movable from a lower position wherein said mower deck is in its said lower position with respect to said frame means, to an upper position wherein said mower deck is in its said upper position with respect to said frame means;

an arcuate frame means, having upper and lower ends, positioned adjacent said control lever and having a plurality of vertically spaced-apart openings formed therein;

a selectively removable pin means extending through one of said openings, below said lever and in the movable path thereof for selectively limiting the lowermost position to which said lever may be moved to limit the downward movement of said mower deck with respect to said wheeled frame means;

and means on said upper end of said arcuate frame means for selectively maintaining said lever in its said upper position so that said mower deck is maintained in its said upper position with respect to said wheeled frame means;

said arcuate frame means comprising a pair of spaced-apart arcuate frame members, each of said arcuate frame members having a plurality of said spaced-apart openings formed therein; said lever being selectively movably positioned between said arcuate frame members; said means on said upper end of said arcuate frame means for selectively maintaining said lever in its said upper position comprising a laterally offset recessed portion on one of said arcuate frame members.

* * * * *